US006351653B1

(12) United States Patent
Alberth, Jr. et al.

(10) Patent No.: US 6,351,653 B1
(45) Date of Patent: Feb. 26, 2002

(54) CELLULAR TELEPHONE WITH SIMULTANEOUS RADIO AND CELLULAR COMMUNICATIONS

(75) Inventors: William P. Alberth, Jr., Crystal Lake; Christopher Neil Kurby, Elmhurst, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/594,987

(22) Filed: Jun. 15, 2000

(51) Int. Cl.[7] .................................................. H04B 1/38
(52) U.S. Cl. ...................... 455/552; 455/422; 455/425; 455/426; 455/463; 455/15
(58) Field of Search ............................ 455/66, 90, 553, 455/556, 575, 422, 425, 426, 463, 15, 552, 563, 344, 88, 11.1

(56) References Cited

U.S. PATENT DOCUMENTS 5,675,629 A * 10/1997 Raffel et al. .................. 379/58
5,878,344 A * 3/1999 Zicker .......................... 455/426
5,887,259 A * 3/1999 Zicker et al. ................. 455/434
5,915,212 A * 6/1999 Przemoliec et al. ........... 455/83
6,243,593 B1 * 6/2001 Zicker .......................... 455/553

* cited by examiner

Primary Examiner—Daniel Hunter
Assistant Examiner—Yemane Waldentatios
(74) Attorney, Agent, or Firm—Paul J. Bartusiak

(57) ABSTRACT

A cellular telephone (110) forms part of a wireless communication system (100) and has simultaneous communication of radio and cellular signals. The wireless communication system (100) has a base station (115) and one or more radios (120). The cellular telephone (110) has control circuitry (205), a cellular transceiver (215), a radio transceiver (210), a microphone (220), and a speaker (225). The simultaneous communication of radio and cellular signals permits a radio user to participate in a cellular phone call and permits a cellular telephone user to participate in the radio communication. Simultaneous communication is communication of cellular and radio signals at the same time and at substantially the same time.

58 Claims, 7 Drawing Sheets

CELLULAR TELEPHONE WITH SIMULTANEOUS RADIO AND CELLULAR COMMUNICATIONS

FIELD OF THE INVENTION

This invention relates generally to wireless communication systems. More particularly, this invention relates to cellular telephones capable of radio and cellular communication at substantially the same time.

BACKGROUND OF THE INVENTION

Consumers desire communication equipment having greater flexibility and more options for use with existing communication systems. In recent years, Family Radio Service (FRS) has gained in popularity. FRS is a short distance, two-way personal radio service. In a typical FRS system, there are two or more hand-held radio communicators. Each radio communicator has a transceiver, which operates in half duplex mode, at ½ watt or less, and within a particular UHF frequency band.

FRS enables members of a group to communicate with other members of the group who are out of speaking range but are within the same general area. Campers, hikers, cyclists, and other outdoor enthusiasts use FRS to keep in contact with one another. Parents use FRS to keep in touch with children playing in the neighborhood. Families or friends use FRS to keep in contact with one another while at shopping malls, sporting events, and similar activities.

FRS is suitable for group members to communicate with one another when they are in the same general area. However, FRS is not suited for communication beyond the general area and with cellular communication systems. FRS transceivers have a range of less than one half mile and operate in a frequency band incompatible with cellular communication. Moreover, FRS operates in half duplex mode, whereas cellular telephones operate in full duplex mode.

To communicate beyond the general area or with a cellular system, one FRS group member must make a cellular phone call while in radio communication with other FRS members. However, the other members cannot participate in the cellular call directly. They cannot make the cellular call; the person using the cellular telephone must do it for them. Everyone must relay messages through the member using the cellular telephone. In addition, one of the FRS group members must carry the cellular telephone.

Accordingly, there is a need for a cellular telephone permitting radio and cellular communication.

BRIEF DESCRIPTION OF SEVERAL VIEWS OF THE DRAWINGS

The present invention may be better understood when read in connection with the accompanying drawings, of which.

DETAILED DESCRIPTION OF THE INVENTION

Figure 1:
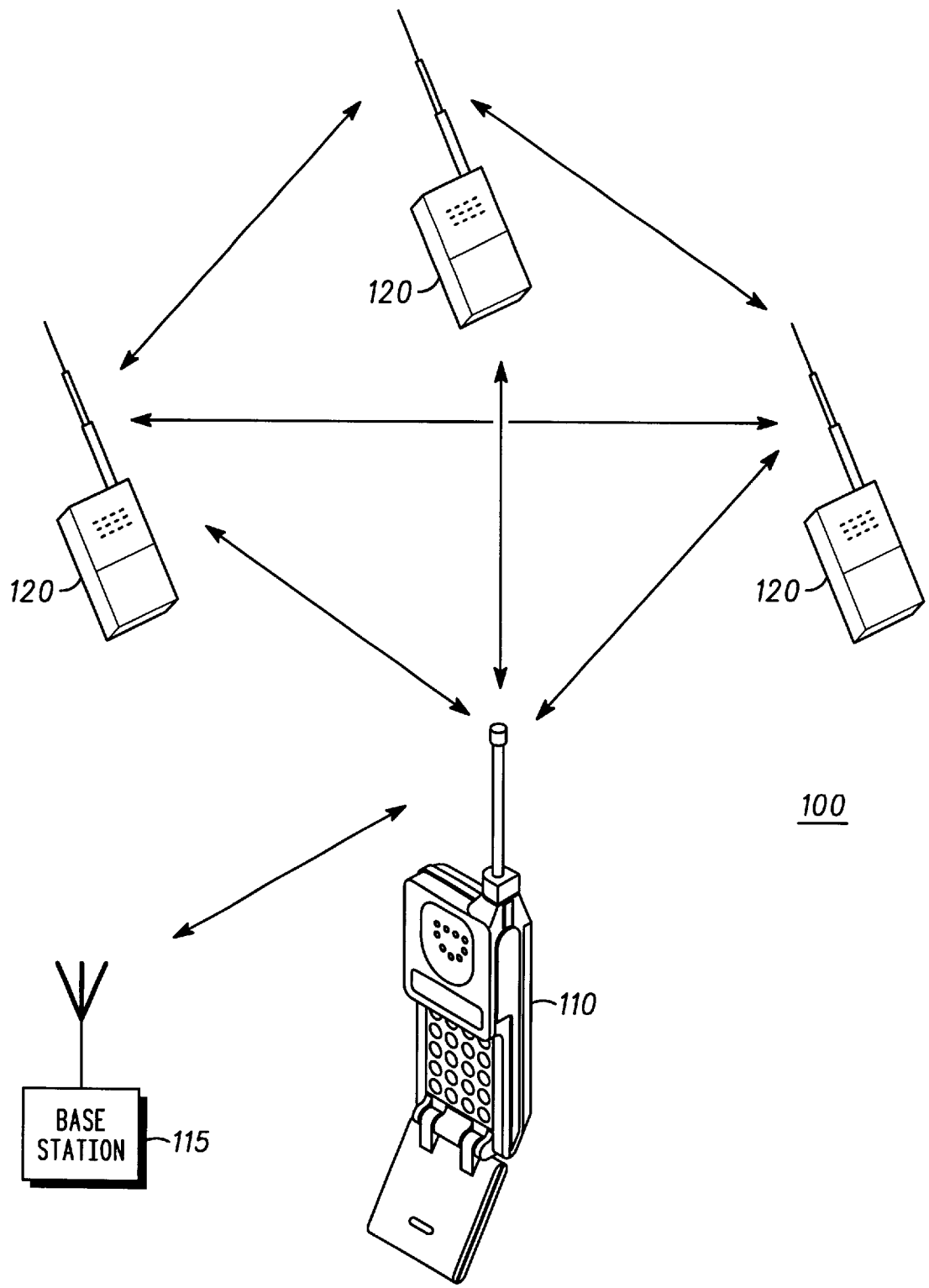
FIG. 1 shows a perspective view of a wireless communication system having a cellular telephone with simultaneous communication of radio and cellular signals according to a preferred embodiment of the present invention.

FIG. 1 shows a wireless communication system 100 with a cellular telephone 110 having simultaneous communication of cellular and radio signals according to the present invention. The radios 120 transmit and receive a radio signal between each other and the cellular telephone 110. The cellular telephone 110 transmits and receives the radio signal from the radios 120. The cellular telephone 1 10 also transmits and receives a cellular signal from a base station 115. The wireless communication system 100 may use portable, mobile, other types, and combinations of cellular telephones and radios. The wireless communications system 100 may have multiple base stations, cellular telephones, and more radios.

The cellular telephone 110 transmits and receives the cellular signal from the base station 115 using full duplex mode. The cellular signal may be digital or analog, multiple signals, within single or multiple bandwidths, or any other signal appropriate for full duplex communication.

The cellular signal has a cellular uplink signal and a cellular downlink signal. The cellular uplink signal is for communication from the cellular transceiver 215 (see FIG. 2) to the base station 115. The cellular downlink signal is for communication from the base station 115 to the cellular transceiver 215.

The cellular telephone 110 transmits and receives the radio signal from one or more radios 120 using half duplex mode. The radio signal may be digital, analog, or any other signal appropriate for providing half duplex communication. Preferably, the radio signal is within the UHF 460 MHz band. However, other frequencies may be used.

The radio signal has a radio uplink signal and a radio downlink signal. The radio uplink signal is for communication from the radio transceiver 210 (see FIG. 2) to the radio 120. The radio downlink signal is for communication from the radio 120 to the radio transceiver 210.

Figure 2:
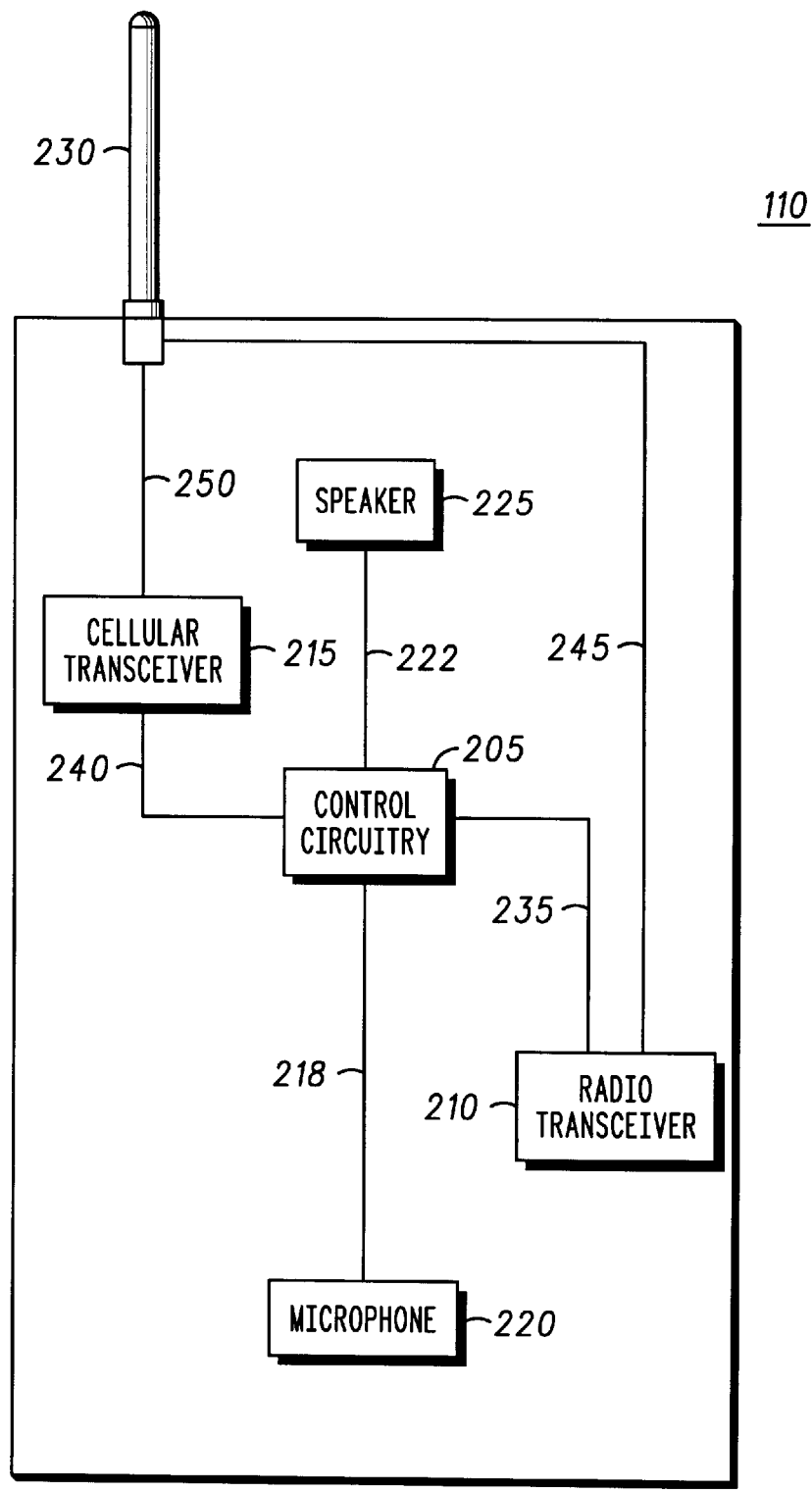
FIG. 2 shows a block diagram of a cellular telephone having simultaneous communication of radio and cellular signals according to a preferred embodiment of the present invention.

FIG. 2 shows a block diagram of the cellular telephone 110 according to the present invention. The cellular telephone 110 has control circuitry 205, a radio transceiver 210, a cellular transceiver 215, a microphone 220, a speaker 225, and an antenna 230.

Control circuitry 205 has a microprocessor capable of operating and controlling the cellular telephone 110. The control circuitry is connected to the microphone 220 via wire 218 and to the speaker 225 via wire 222. While the microphone 220 and the speaker 225 are shown as internal components of the cellular telephone, they individually or in combination may be externally connected to the cellular telephone 110 through cables, wireless, or other links (not shown). The speaker 225 has multiple audio volume settings—one setting for the audio from the cellular signal and another setting for the audio from the radio signal. Similarly, the microphone 220 has multiple audio volume settings—one setting for the audio transmitted via cellular transceiver 215 and another setting for the audio transmitted via the radio transceiver 210.

Control circuitry 205 connects to the radio transceiver 210 via wire 235. While wire 235 is illustrated as a single connector, it may provide multiple, independent connections such as to a radio transmitter (not shown) and a radio receiver (not shown) in the radio transceiver 210. While the radio transceiver is shown as an internal component of the cellular telephone, it may be externally connected to the cellular telephone 110 through a cable, wireless, or other link (not shown). Preferably, the radio transceiver 210 operates at ½ watt or less within the UHF 460 MHz band. Preferably, the operating range of the radio transceiver is less than one half mile.

The radio transceiver may be part of a radio unit (not shown) for external use with the cellular telephone 110. The radio may clip onto the cellular telephone or be positioned nearby. The radio unit may connect to the cellular telephone through a cable, wireless, or other link. In addition to housing the radio transceiver, the radio unit may have another antenna configured for radio transmissions and its own power source. The radio unit may operate as a radio when not connected to the cellular telephone.

Control circuitry 205 connects to the cellular transceiver 215 via wire 240. While wire 240 is illustrated as a single connector, it may provide multiple, independent connections such as to a cellular transmitter (not shown) and a cellular receiver (not shown) in the cellular transceiver 215. While the cellular transceiver is shown as an internal component of the cellular telephone, it may be externally connected to the cellular telephone 110 through a cable, wireless, or other link (not shown).

The radio transceiver connects to the antenna 230 via wire 245. The cellular transceiver 215 connects to the antenna 230 via wire 250. The antenna 230 is dual mode. When the antenna 230 is used for the radio transceiver 210, it preferably has a unity gain and the power available to the radio transceiver 210 limits its range to less than one half mile. Alternatively, separate antennas may be connected to the radio transceiver 210 and the cellular transceiver 215.

Referring to FIGS. 1 and 2, the cellular telephone 110 provides simultaneous communication of cellular and radio signals. As the name implies, simultaneous communication is communication of radio and cellular signals at the same time. For example, a cell phone user speaks into the microphone 220, sending a voice signal to the control circuitry 205. The control circuitry 205 converts the voice signal into cellular and radio signals for transmission via the cellular and radio transceivers respectively. The radio transceiver 210 transmits the radio signal to the radio 120 at the same time the cellular transceiver 215 transmits the cellular signal to the base station 115. In this manner, the voice signal is conveyed to the radio user and to a person connected to the base station at the same time.

Simultaneous communication also is communication of cellular and radio signals at substantially the same time so a radio user may participate in a cellular phone call or otherwise use the cellular telephone 110. Similarly, simultaneous communication is communication of cellular and radio signals at substantially the same time so a cellular telephone user or person may participate in a radio communication or otherwise use the radio 120. For example, a radio user speaks into the radio 120, sending the radio signal to the cellular telephone 110. The radio transceiver 210 receives the radio signal and conveys it to the control circuitry 205. The control circuitry 205 converts the radio signal into an audio signal and conveys the audio signal to the speaker 225. The control circuitry 205 converts the radio signal into the cellular signal and conveys it to the cellular transceiver 215 for transmission to the base station 115. In this manner, the radio signal is conveyed to the cellular telephone user and to a person connected to the base station at substantially the same time.

Simultaneous communication is communication at the same time and at substantially the same time. These terms are interchangeable. In an alternate operating mode, the transmission of the radio uplink signal may occur at substantially the same time, but not the same time, as the transmission of the cellular uplink signal. In this operating mode, the cellular telephone 110 lowers the transmitting power to limit the range of the radio transmission to less than one half mile. This powering down mode may be confined to the operation of the radio transceiver 210.

In operation, the radio transceiver 210 transmits the radio uplink signal and receives the radio downlink signal in half duplex mode. The cellular transceiver 215 transmits the cellular uplink signal and receives the cellular downlink signal in full duplex mode. The transceivers 210, 215 operate at substantially the same time so a radio user can participate in a cellular phone call and a cellular phone user can participate in a radio communication.

When the cellular telephone is used, the control circuitry 205 determines whether communication is desired or established with the base station 115 and the radio 120. When communication with the base station 115 is desired or established, the control circuitry 205 converts the voice signal from the microphone 220 into the cellular uplink signal for transmission by the cellular transceiver 215 to the base station 115. The control circuitry 205 also converts the cellular downlink signal received by the cellular transceiver 215 into an audio signal for the speaker 225.

When communication with the radio 120 is desired or established, the control circuitry 205 converts the voice signal from the microphone 220 into the radio uplink signal for transmission by the radio transceiver 210 to the radio 120. The control circuitry 205 also converts the radio downlink signal received by the radio transceiver 210 into an audio signal for the speaker 225.

When communication is desired or established with both the base station 115 and the radio 120, the control circuitry 205 converts and combines various incoming and outgoing signals. The communication of the converted and combined signals is done simultaneously so the cellular telephone user, radio user or users, and person connected via the base station may participate in the same phone/radio call.

The control circuitry 205 converts the voice signal from the microphone 220 into a cellular voice signal and a radio voice signal. The control circuitry 205 converts the radio downlink signal into a radio speaker signal and a radio base signal. The control circuitry 205 converts the cellular downlink signal into a cellular speaker signal and a cellular radio signal.

The control circuitry 205 combines the cellular voice signal and the radio base signal into the uplink cellular signal for transmission from the cellular transceiver 215 to the base station 115. The control circuitry 205 combines the radio voice signal and the cellular radio signal into the uplink radio signal for transmission from the radio transceiver 210 to the radio 120. The control circuitry 205 combines the cellular speaker signal and the radio speaker signal into a combined audio signal for the speaker 225.

For the voice signal from the microphone, the cellular transceiver 215 transmits the cellular uplink signal to the base station 115 at substantially the same time as the radio transceiver 210 transmits the radio uplink signal to the radio 120. For the radio downlink signal, the cellular transceiver 215 transmits the cellular uplink signal at substantially the same time as the combined audio signal is conveyed to the speaker 225. For the cellular downlink signal, the radio transceiver 210 transmits the radio uplink signal at substantially the same time as the combined audio signal is conveyed to the speaker 225.

The cellular telephone 110 operates as a radio when there is no cellular communication with base station 115. The control circuitry 205 converts the radio downlink signal into the audio signal for the speaker 225. The control circuitry 205 converts the voice signal from the microphone 220 into the radio uplink signal for transmission from the radio transceiver 210 to the radio 120. Even when there is cellular communication with the base station 115, the cellular telephone 110 may operate similarly as a radio during those periods when no cellular signal is transmitted or received.

The cellular telephone 110 also operates as a cellular telephone when there is no radio communication with the radio 120. The control circuitry 205 converts the cellular downlink signal into the audio signal for the speaker 225. The control circuitry 205 converts the voice signal from the microphone 220 into the radio uplink signal for transmission from the cellular transceiver 215 to the base station 115. Even when there is radio communication with the radio 120, the cellular telephone 110 may operate similarly as a cellular telephone during those periods when no radio signal is transmitted or received.

A radio user or a person connected to the base station may use the cellular telephone for a cellular call or radio communication without the intervention of the cellular telephone user. The cellular telephone may need to be turned-on or operating at least in a stand-by mode. Alternatively, the radio or cellular signal may activate a turned-off cellular telephone. The control circuitry 205 may have a push button (note shown) or other activation means, such as voice detection, for the cellular telephone user to enable or disable this feature.

When the cellular telephone is used without the intervention of the cellular telephone user, the control circuitry 205 converts the downlink radio signal into the cellular uplink signal. The control circuitry 205 converts the downlink cellular signal into the radio uplink signal. The radio downlink and cellular downlink signals may include data signals so the radio user and a person connected the base station 115 may initiate phone calls or radio communication without the intervention of the cellular telephone user.

Additionally, the control circuitry 205 may block or maintain the transmitting or receiving of the radio signal by the radio transceiver so that responses from the base station 115 may be received by the radio 120. For example, the radio user needs to know if someone answers a call or the line is busy once the call is initiated.

The radio transceiver 210 and the radio 120 operate in half duplex mode, which may interfere with communication between the cellular telephone and radio users. There is a greater opportunity for this interference when a person is communicating to the cellular telephone user through the base station 115. The communication between the person and the cell phone user would block input from the radio user. Their conversation would place the radio transceiver 210 into transmit mode, preventing the user of radio 120 from adding his comments to the conversation.

To control this situation, the present invention provides "push-to-talk" and "push-to-receive" modes of operation. The push-to-talk mode provides a radio retention means for maintaining the transmission of the radio uplink signal from the radio transceiver 210 to the radio 120. The voice signal from the microphone 220 and the cellular downlink signal from the base station 115 are converted and combined into the radio uplink signal. The radio uplink signal is then transmitted to the radio 120 without any interruptions from the radio 120.

The radio retention means may be a control signal from the control circuitry 205 shutting down the radio receiver (not shown) in the radio transceiver 210. The radio retention means may be a control signal shutting down the radio transmitter (not shown) in the radio 120. Other radio retention means may be used if suitable for maintaining the transmission of the radio uplink signal from the cellular telephone 110 or for stopping the transmission of the radio downlink signal from the radio 120.

The push-to-receive mode provides a radio disablement means for stopping the transmission of the radio uplink signal from the radio transceiver 210. The radio downlink signal is received and transmitted by the cellular telephone 110 without any interruptions from the cellular telephone 110. The disablement means may be a control signal from control circuitry 205 shutting down the radio transmitter (not shown) in the radio transceiver 210. The disablement means may be a control signal shutting down the radio receiver (not shown) in the radio 120. Other disablement means may be used if suitable for stopping the transmission of the radio uplink signal from the cellular telephone 110 or for maintaining the transmission of the radio downlink signal from the radio 120.

Either of the push-to-talk and push-to-receive modes may be activated using a push button (not shown). Multiple buttons may be used as well as a button on the radio. Alternatively, these modes may be activated by a voice detection system. The voice detection system may active when a voice or audio signal is "heard" or when a particular command is given.

The radio transceiver 210 may transmit or receive pages from the radio. Preferably, the paging capability is part of the radio transceiver 210. However, the cellular telephone 110 may include a separate pager internally, externally, or as part of the radio unit. The cellular telephone 110 transmits the page signal to the radio 120 when a cellular call is received. The cellular telephone 110 may transmit the page signal without the intervention of the cell phone user.

The cellular telephone 110 has different alarms (not shown) that activate when the different signals are received. The alarms may be lights, sounds, mechanical (vibrations), other alerting means, and combinations. A first alarm is activated when a cellular call is received. A second alarm is activated when a page is received. A third alarm is activated when a radio communication is received. The second and third alarms may be the same alarm if the pager is part of the radio transceiver 210.

Figure 3:
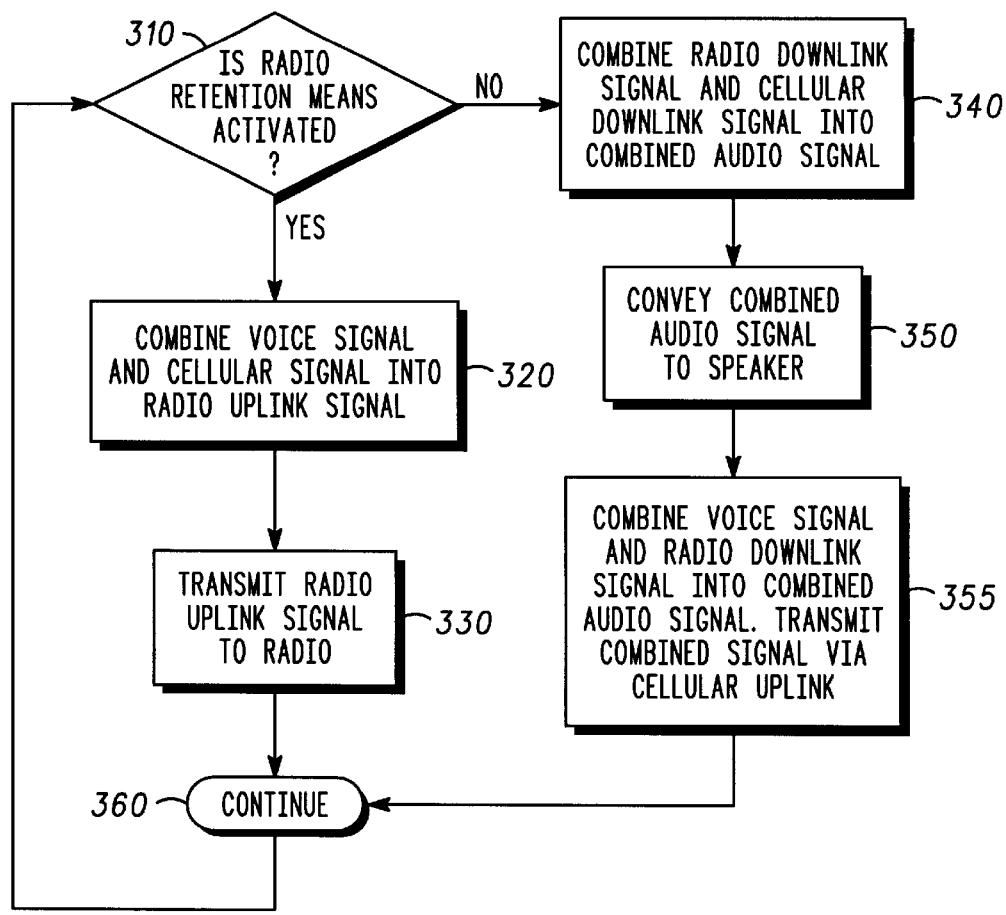
FIG. 3 is a flowchart of a push-to-talk mode for the simultaneous communication of radio and cellular signals according to a preferred embodiment of the present invention.

FIG. 3 is a flowchart of the push-to-talk operating mode of the cellular telephone 110. As discussed, the push-to-talk mode uses radio retention means to maintain the radio transmission from the cellular telephone 110. In Step 310, the control circuitry 205 determines whether the radio retention means is activated.

In Step 320, if the radio retention means is activated, the voice signal from the microphone 220 is combined with the cellular downlink signal from the base station 115 into the radio uplink signal. In Step 330, the radio uplink signal is transmitted to the radio 120, while simultaneously transmitting the voice signal on the cellular uplink. In Step 360, the method continues to Step 310 to see whether the radio retention means is activated.

In Step 340, if the radio retention means is not activated, the radio downlink signal and the cellular downlink signal are combined into the combined audio signal. In Step 350, the combined audio signal is conveyed to the speaker 225. In Step 355, the audio signal and radio downlink into are combined into a combined audio signal. This combined audio signal is transmitted via the cellular uplink. In Step 360, the method continues to Step 310 to see whether the radio retention means is activated.

Figure 4:
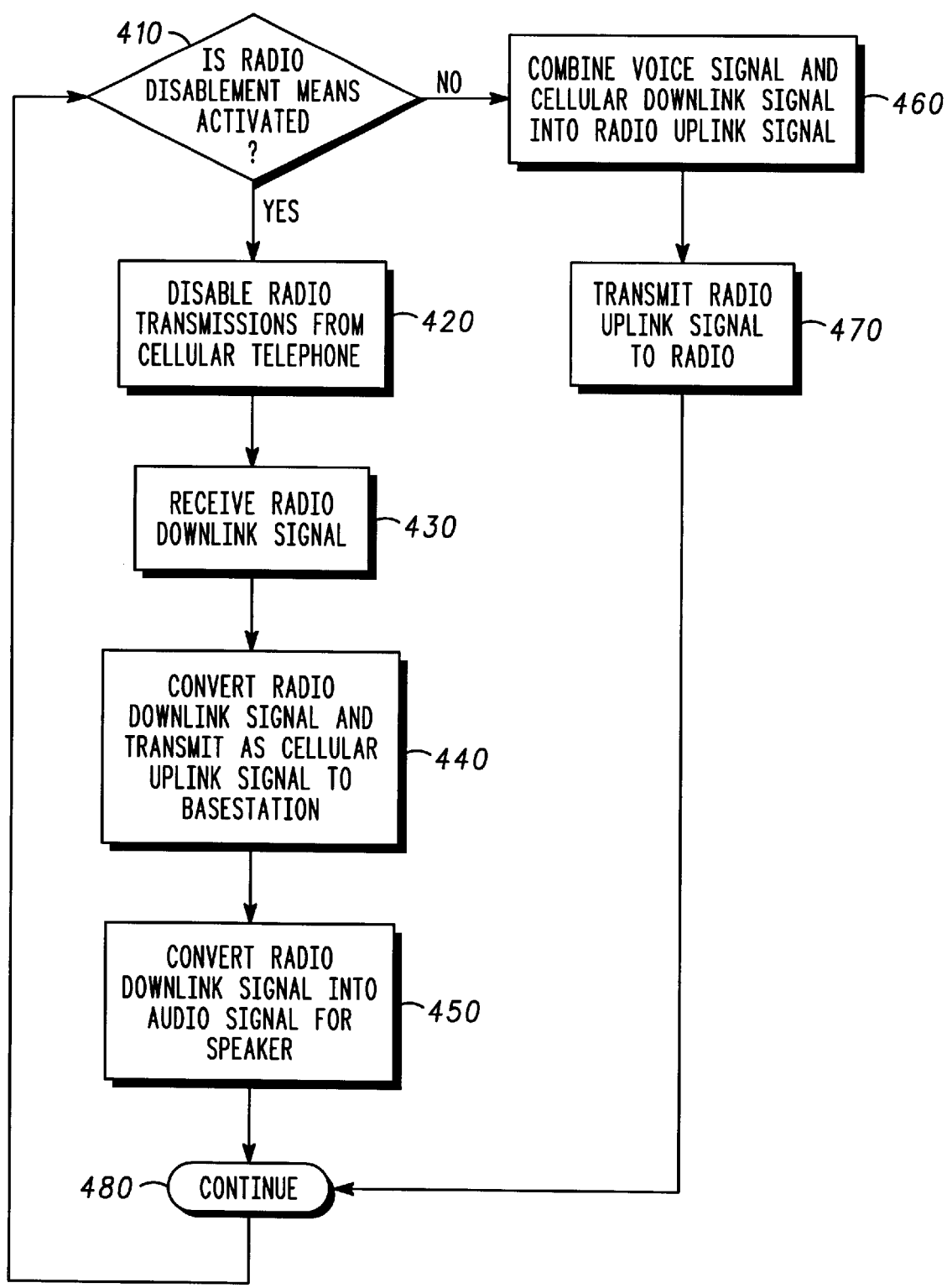
FIG. 4 is a flowchart of a push-to-receive mode for the simultaneous communication of radio and cellular signals according to a preferred embodiment of the present invention.

FIG. 4 is a flowchart of the push-to-receive operating mode of the cellular telephone 110. As discussed, the push-to-receive mode uses radio disablement means to stop the radio transmission from the cellular telephone 110. In Step 410, the control circuitry 205 determines whether the radio disablement means is activated.

In Step 420, if the radio disablement means is activated, the control circuitry 205 disables the radio transmissions from the cellular telephone 110. In Step 430, the radio downlink signal is received. In Step 440, the radio downlink signal is converted and transmitted as the cellular uplink signal to the base station 115. In Step 450, the radio downlink signal is converted into the audio signal for the speaker 220. In Step 480, the method continues to Step 410 to see whether the radio disablement means is activated.

In Step 460, if the radio disablement means is activated, the voice signal from the microphone 220 is combined with the cellular downlink signal from the base station 115 into the radio uplink signal. In Step 470, the radio uplink signal is transmitted to the radio 120. In Step 480, the method continues to Step 410 to see whether the radio disablement means is activated.

Figure 5:
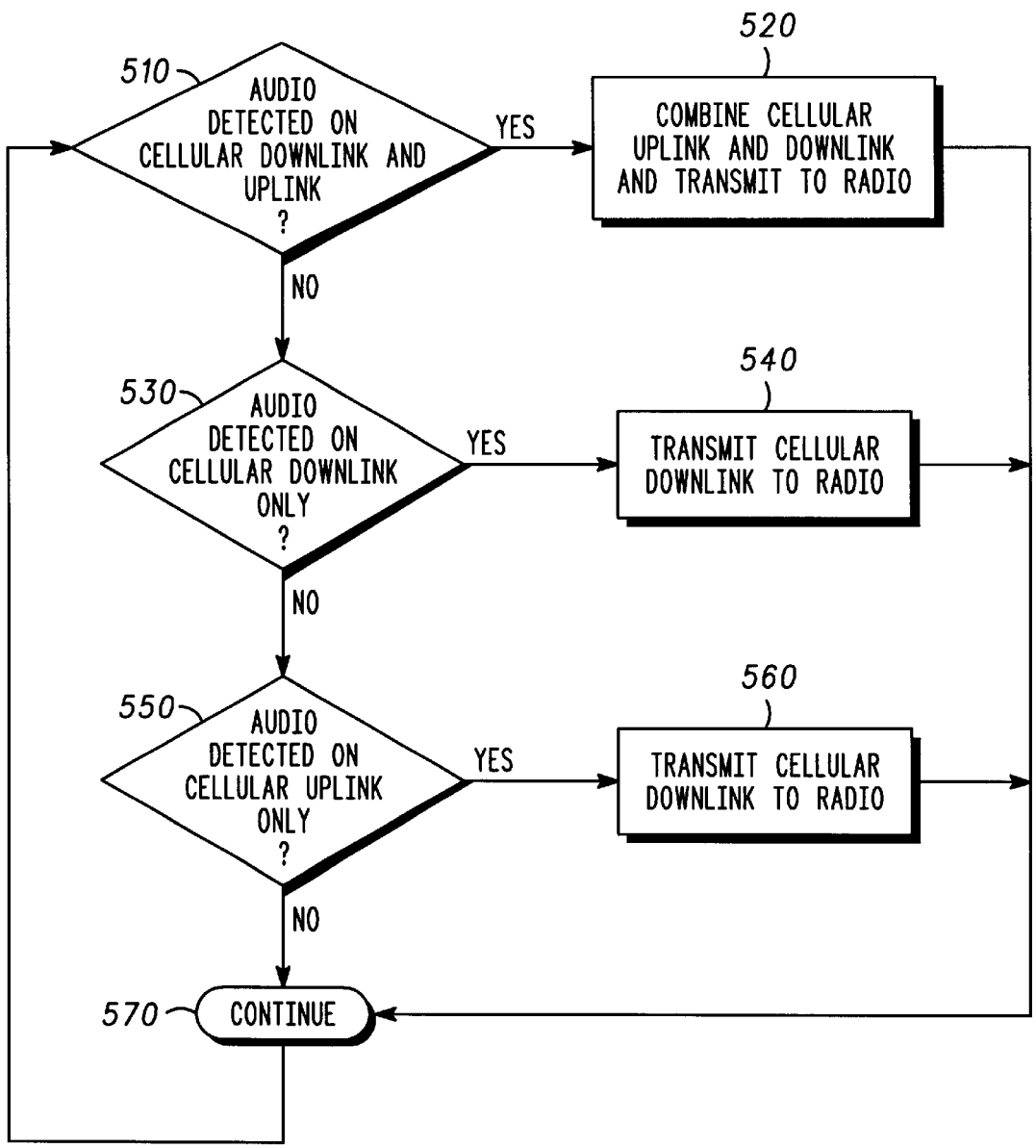
FIG. 5 is a flowchart for using voice detection to simultaneously communicate radio and cellular signals according to a preferred embodiment of the present invention.

FIG. 5 is a flowchart for using voice detection to activate the radio transceiver 210. In Step 510, the control circuitry 205 determines whether audio is detected on both the cellular downlink and uplink signals. In Step 520, if audio is detected on both signals, the cellular uplink and downlink signals are combined into the radio uplink signal and transmitted to the radio 120. In Step 570, Step 510 starts again.

In Step 530, the control circuitry 205 determines whether audio is detected on only the cellular downlink. In Step 540, if audio is detected only on the cellular downlink, the cellular downlink signal is transmitted to the radio 120. In Step 570, Step 510 starts again.

In Step 550, the control circuitry 205 determines whether audio is detected on only the cellular uplink. In Step 560, if audio is detected only on the cellular uplink, the cellular uplink signal is transmitted to the radio 120. In Step 570, Step 510 starts again.

Figure 6:
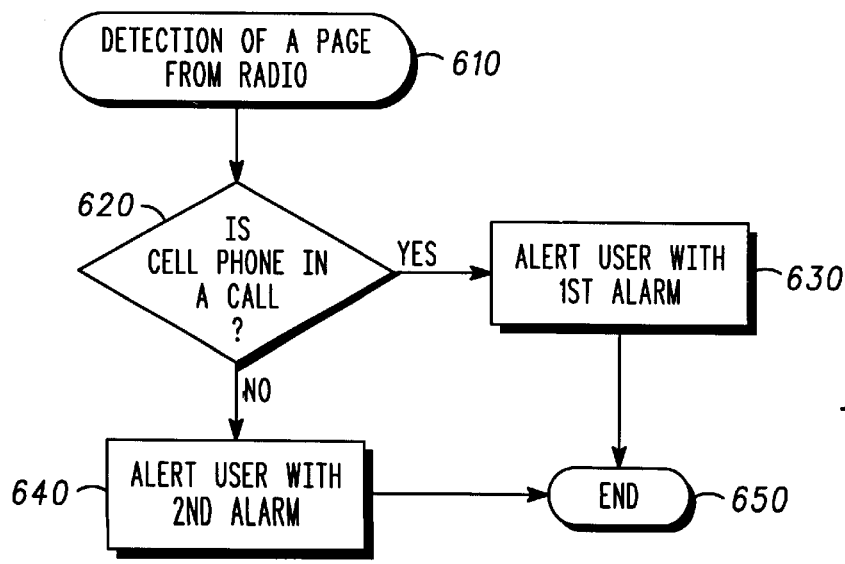
FIG. 6 is a flowchart for alerting a user of an incoming page to a cellular telephone according to a preferred embodiment of the present invention.

FIG. 6 is a flowchart for using alternate alarms when a page is detected. In Step 610, the cellular telephone detects a page signal from the radio 120. In Step, 620, the control circuitry 205 determines whether the cellular telephone 110 has a cellular phone call. In Step 630, if there is a cellular call, a first alarm is activated. The first alarm may be selected by the user and may alert the user with tones, vibrations, lights, and other means. The first alarm has a low volume or other adjustments to compensate for the close proximity of the cellular telephone 110 to the user. In Step 640, if there is no cellular call, a second alarm is activated. The second alarm may be selected by the user and may alert the user with tones, vibrations, lights, and other means. In Step 650, the alarms end.

Figure 7:
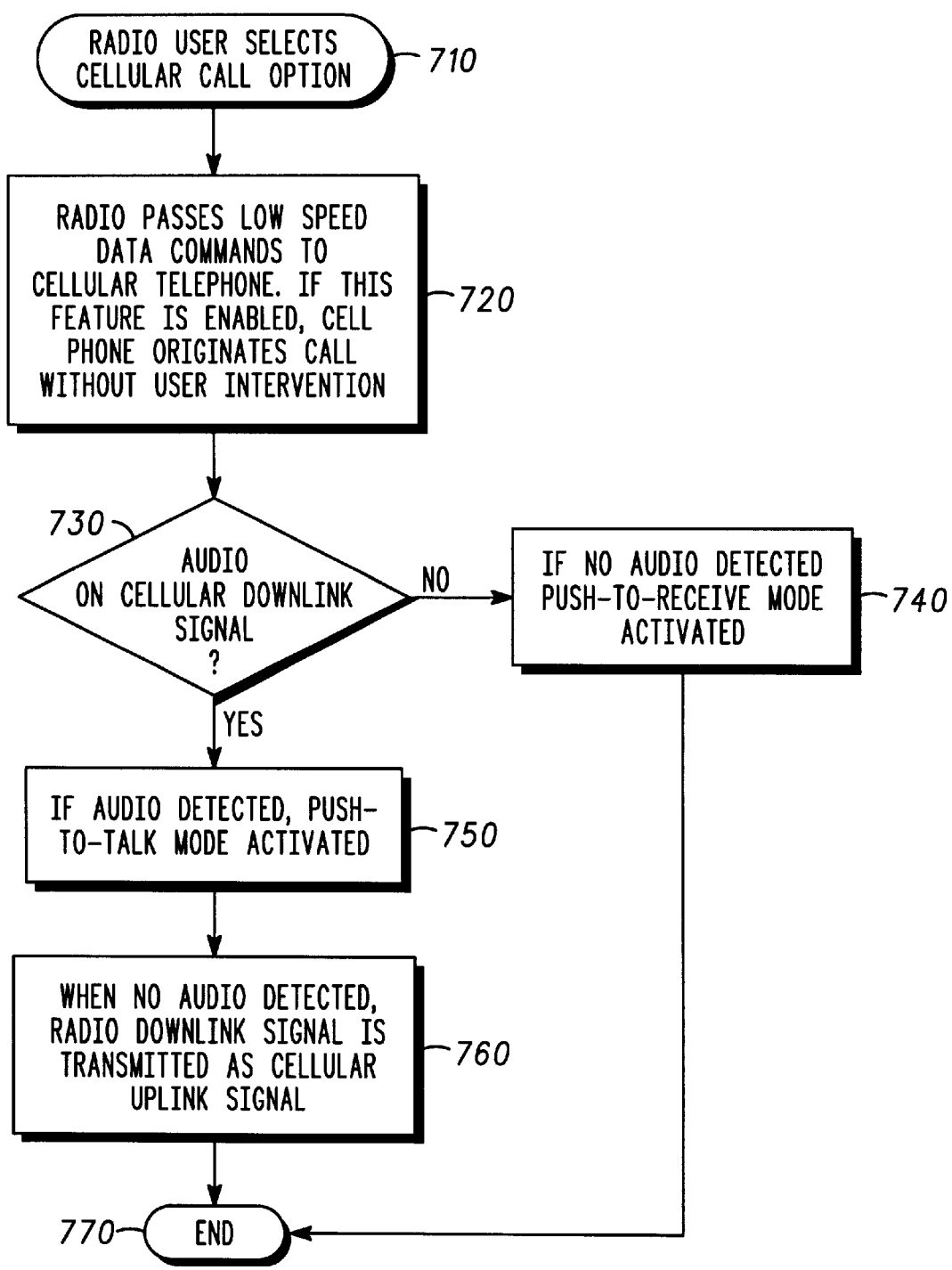
FIG. 7 is a flowchart for using a radio to make a cellular call on a cellular telephone according to a preferred embodiment of the present invention.

FIG. 7 is a flowchart for using the radio 120 to make a cellular call on the cellular telephone 110. In Step 710, the radio user selects to activate a cellular call option on the radio 120. In Step 720, the radio 120 passes low-speed data commands to the cellular telephone 110. The data commands initiate the cellular call without the cellular telephone user's intervention. In Step 730, the cellular telephone 110 determines whether audio is detected on the cellular downlink signal. In Step 740, if no audio is detected, the push-to-receive mode is detected on the cellular telephone 110. In Step 750, if audio is detected, the push-to-talk mode is activated on the cellular telephone 110. In Step 760, the radio downlink signal is transmitted as the cellular uplink signal when no audio is detected on the cellular downlink signal. In Step 770, the call is ended in Step 770.

Figure 8:
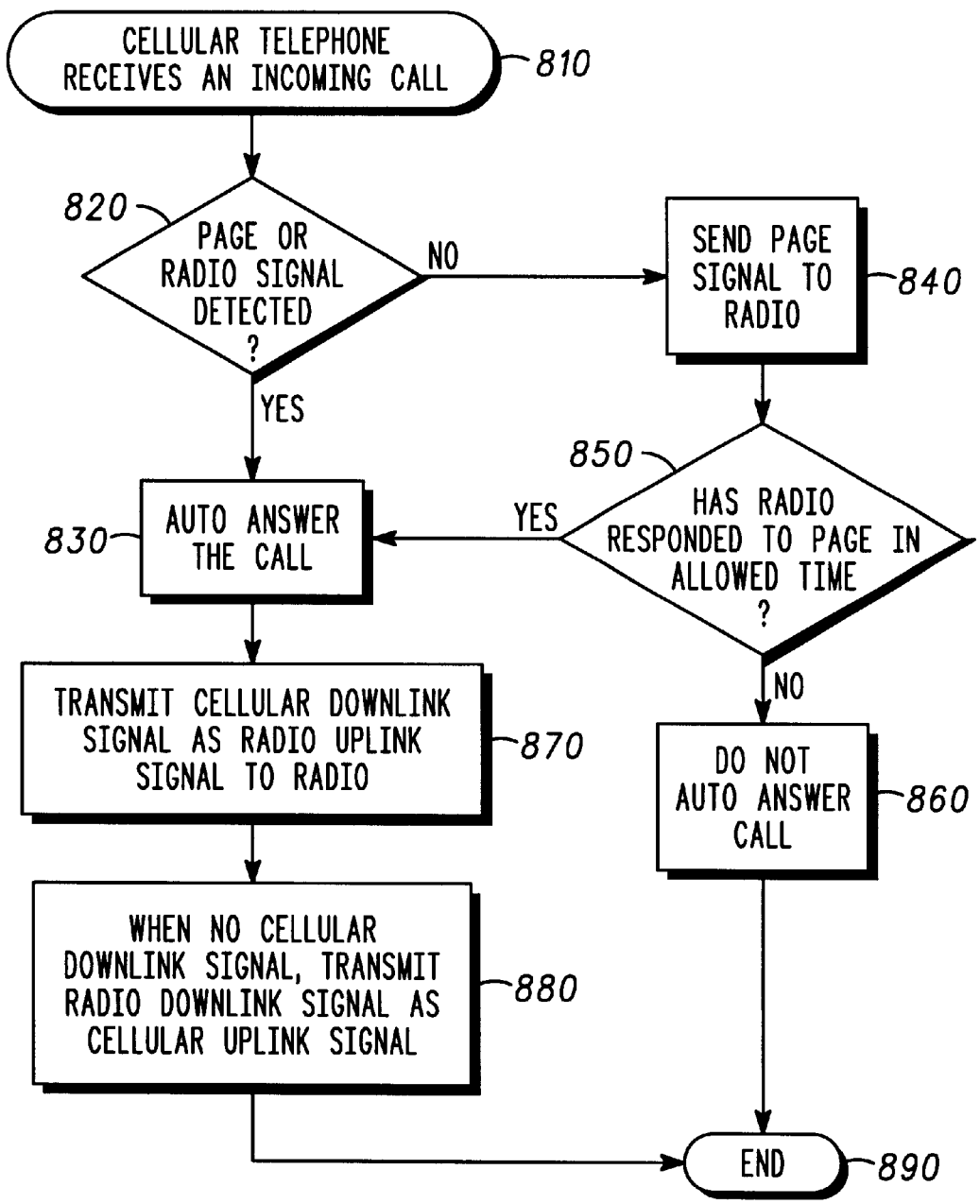
FIG. 8 is a flowchart for using a radio to answer a cellular call on a cellular telephone according to a preferred embodiment of the present invention.

FIG. 8 is a flowchart for paging the radio 120 when a cellular call is received on the cellular telephone 110 and the option of passing phone calls to radio 120 is enabled. In Step 810, the cellular telephone 110 receives an incoming cellular call. In Step 820, the cellular telephone determines whether there is a page or radio signal from the radio 120. In Step 830, if there is page or radio signal, the cellular telephone 110 auto answers the cellular call. In Step 840, if there is no page or radio signal, the cellular telephone 110 sends a page signal to the radio 120. In Step 850, the cellular telephone 110 determines whether the radio 120 has responded to the page within a predetermined time period, such as 4 seconds. In Step 860, if the radio 120 does not respond to the page, the cellular telephone 110 does not auto answer the cellular call. If the radio does respond to the page, flow proceeds to step 830 and the cell telephone auto answers the cellular call. In Step 870, the cellular telephone 110 transmits the cellular downlink signal as a radio uplink signal to the radio 120. In Step 880, the radio downlink signal is transmitted as the cellular uplink signal when no cellular downlink signal is detected. In Step 890, the cellular call ends.

While the invention has been descried an illustrated, this description is by way of example only. Additional advantages will occur readily to those skilled in the art, who may make numerous changes without departing from the true spirit and scope of the invention. Therefore, the invention is not limited to the specific details, representative devices, and illustrated examples in this description. Accordingly, the scope of this invention is to be limited only as necessitated by the accompanying claims.

What is claimed is:

1. A cellular telephone comprising:
   control circuitry;
   a cellular transceiver connected to the control circuitry, wherein the cellular transceiver transmits and receives a cellular signal; and
   a radio transceiver operatively connected to the control circuitry, wherein the radio transceiver transmits and receives a radio signal;
   wherein the cellular transceiver and the radio transceiver operate simultaneously.

2. A cellular telephone according to claim 1, wherein the control circuitry initiates the cellular signal in response to the radio signal.

3. A cellular telephone according to claim 1, wherein the control circuitry initiates the radio signal in response to the cellular signal.

4. A cellular telephone according to claim 1, further comprising:
   a microphone operatively connected to the control circuitry, wherein the microphone provides a voice signal to the control circuitry, and
   wherein the control circuitry converts the voice signal into a cellular signal for transmission by the cellular transceiver, converts the voice signal into a radio signal for transmission by the radio transceiver, and delivers the cellular and radio signals to the cellular and radio transceivers for simultaneous transmission.

5. A cellular telephone according to claim 1, further comprising:
   a speaker operatively connected to the control circuitry, wherein the speaker receives a combined audio signal from the control circuitry, wherein
   the control circuitry converts the cellular signal into a cellular audio signal, converts the radio signal into a radio audio signal, and combines the cellular audio signal and the radio audio signal into the combined audio signal.

6. A cellular telephone according to claim 1, wherein the control circuitry receives the cellular signal from the cellular transceiver, converts the cellular signal into the radio signal, and provides the radio signal to the radio transceiver.

7. A cellular telephone according to claim 6, further comprising:
   a speaker operatively connected to the control circuitry, wherein
   the control circuit converts the cellular signal into an audio signal and provides the audio signal to the speaker.

8. A cellular telephone according to claim 1, wherein the control circuitry receives the radio signal from the radio transceiver, converts the radio signal into the cellular signal, and provides the cellular signal to the cellular transceiver.

9. A cellular telephone according to claim 8, further comprising:
   a speaker operatively connected to the control circuitry, wherein
   the control circuit converts the radio signal into an audio signal and provides the audio signal to the speaker.

10. A cellular telephone according to claim 1, further comprising radio retention means for maintaining the transmission of the radio signal from the radio transceiver.

11. A cellular telephone according to claim 10, wherein the control circuitry receives the cellular signal from the cellular transceiver and converts the cellular signal into the radio signal.

12. A cellular telephone according to claim 10, further comprising a microphone operatively connected to the control circuitry, wherein the microphone provides a voice signal to the control circuitry, and wherein the control circuitry converts the voice signal into the radio signal.

13. A cellular telephone according to claim 10, further comprising:
   a microphone operatively connected to the control circuitry, wherein the microphone provides voice signal to the control circuitry, wherein
   the control circuitry converts the voice signal into a microphone radio signal,
   the control circuitry receives the cellular signal from the cellular transceiver and converts the cellular signal into a cellular radio signal, and
   the control circuitry combines the microphone radio signal and the cellular radio signal to form the radio signal.

14. A cellular telephone according to claim 10, wherein the radio retention means is activated by a push button.

15. A cellular telephone according to claim 10, wherein the radio retention means is activated by a voice detection system.

16. A cellular telephone according to claim 1, further comprising radio disablement means for stopping the transmission of the radio signal from the radio transceiver.

17. A cellular telephone according to claim 16, wherein the radio disablement means is activated by a push button.

18. A cellular telephone according to claim 16, wherein the radio disablement means is activated by a voice detection system.

19. A cellular telephone according to claim 1, further comprising a pager connected to the control circuitry, wherein the pager transmits and receives a page signal.

20. A cellular telephone according to claim 1, wherein the radio transceiver transmits and receives a page signal.

21. A cellular telephone according to claim 20, wherein the control circuitry provides a first alarm and a second alarm, the first alarm when the cellular transceiver receives the cellular signal, the second alarm when the radio transceiver receives a page signal.

22. A cellular telephone according to claim 20, wherein the page signal is transmitted when the cellular signal is received.

23. A cellular telephone according to claim 1, further comprising a speaker connected to the control circuitry, the speaker having a first audio volume setting and a second audio setting, the first audio setting for cellular audio created by the cellular signal, the speaker having a second audio volume setting for radio audio created by the radio signal.

24. A cellular telephone according to claim 1, further comprising a microphone connected to the control circuitry, the microphone having a first audio volume setting and a second setting, the first audio volume setting for audio transmitted via the cellular transceiver, the second audio volume setting for audio transmitted via the radio transceiver.

25. A cellular telephone according to claim 1, further comprising a radio unit operatively connected to the cellular telephone, wherein the radio unit contains the radio transceiver.

26. A cellular telephone according to claim 25, wherein the radio unit is integrated into the cellular telephone.

27. A cellular telephone according to claim 25, further comprising a cable for external connection of the radio unit to the cellular telephone.

28. A cellular telephone according to claim 25, further comprising a wireless communications link for connecting the radio unit to the cellular telephone.

29. A cellular telephone according to claim 1, wherein the radio transceiver is integrated into the cellular telephone.

30. A cellular telephone according to claim 1, further comprising a cable for external connection of the radio transceiver to the cellular telephone.

31. A cellular telephone according to claim 1, further comprising a wireless communications link for connecting the radio transceiver to the cellular telephone.

32. A cellular telephone according to claim 1, wherein the radio transceiver has a transmitting range no greater than one half mile.

33. A cellular telephone according to claim 1, wherein the radio transceiver has a maximum transmitting power of ½ watt.

34. A cellular telephone according to claim 1, wherein the radio transceiver transmits and receives within the UHF 460 MHz band.

35. A cellular telephone having simultaneous communication of cellular and radio signals, the cellular telephone comprising:
control circuitry;
a cellular transceiver operatively connected to the control circuitry, wherein the cellular transceiver transmits a cellular uplink signal and receives a cellular downlink signal;
a radio transceiver operatively connected to the control circuitry, wherein the radio transceiver transmits a radio uplink signal and receives a radio downlink signal;
a microphone operatively connected to the control circuitry, wherein
the microphone provides a voice signal to the control circuitry,
the control circuitry delivers the voice signal to the cellular transceiver when communication with a base station is established, the control circuitry converting the voice signal into the cellular uplink signal for transmission by the cellular transceiver to the base station, and
the control circuitry delivers the voice signal to the radio transceiver when communication with a radio is established, the control circuitry converting the voice signal into the radio uplink signal for transmission by the radio transceiver to the radio; and
a speaker operatively connected to the control circuitry, wherein
the speaker receives an audio signal from the control circuitry, and
when communication is established only with the base station, the control circuitry converts the cellular downlink signal into the audio signal,
when communication is established only with the radio, the control circuitry converts the radio downlink signal into the audio signal,
when communication is established with the base station and the radio, the control circuitry
converts the radio downlink signal into a radio audio signal,
converts the cellular downlink signal into a cellular audio signal, and
combines the cellular audio signal and the radio audio signal into the audio signal.

36. A cellular telephone according to claim 35, the cellular telephone further comprising radio retention means for maintaining the transmission of the radio uplink signal from the radio transceiver.

37. A cellular telephone according to claim 35, the cellular telephone further comprising radio disablement means for stopping the transmission of the radio uplink signal from the radio transceiver.

38. A cellular telephone according to claim 37, the cellular telephone further comprising radio retention means for maintaining the transmission of the radio uplink signal from the radio transceiver.

39. A cellular telephone according to claim 35,
wherein the radio transceiver has a maximum transmitting power of ½ watt, and
wherein the radio transceiver transmits and receives within the UHF 460 MHz band.

40. A cellular telephone according to claim 35, wherein the control circuitry receives the cellular downlink signal from the cellular transceiver, converts the cellular downlink signal into the radio uplink signal, and provides the radio uplink signal to the radio transceiver.

41. A cellular telephone according to claim 35, wherein the control circuitry receives the radio downlink signal from the radio transceiver, converts the radio downlink signal into the cellular uplink signal, and provides the cellular uplink signal to the cellular transceiver.

42. A cellular telephone according to claim 35, wherein the control circuitry converts the voice signal into a microphone radio signal, converts the cellular downlink signal into a cellular radio signal, and combines the microphone radio signal and the cellular radio signal to form the radio uplink signal.

43. A cellular telephone according to claim 35, where the radio transceiver transmits and receives a page signal.

44. A cellular telephone according to claim 35, wherein the speaker has a first volume setting and a second volume setting, the first volume setting for the second audio signal created by the cellular downlink signal, the second volume setting for the second audio signal created by the radio downlink signal.

45. A cellular telephone according to claim 35, wherein the radio transceiver is integrated into the cellular telephone.

46. A cellular telephone according to claim 35, further comprising a cable for external connection of the radio transceiver to the cellular telephone.

47. A cellular telephone according to claim 35, further comprising a wireless communications link for connecting the radio transceiver to the cellular telephone.

48. A method for the simultaneous communication of cellular and radio signals in a cellular telephone, the method comprising the steps of:
(a) receiving a cellular downlink signal;
(b) transmitting a cellular uplink signal;
(c) receiving a radio downlink signal or transmitting a radio uplink signal at the same time as steps (a) or (b).

49. A method according to claim 48, wherein the cellular telephone has radio retention means for maintaining the radio transmission from the cellular telephone, wherein step (c) comprises the substeps of:
(c1) if the radio retention means is activated,
combining the cellular uplink and cellular downlink signals into a combined cellular signal,
transmitting the combined cellular signal as the radio uplink signal, and
maintaining the transmission of the radio uplink signal until the radio retention means is deactivated; and
(c2) if the radio retention means is not activated, combining the radio downlink and the cellular downlink signals into a combined audio signal.

50. A method according to claim 48, wherein the cellular telephone has radio retention means for maintaining the radio transmission from the cellular telephone, wherein the radio retention means is activated and deactivated by voice detection, wherein step (c) comprises the substeps of:
(c1) if voice communication is detected on both the cellular uplink and cellular downlink signals,
combining the cellular uplink and cellular downlink signals into a combined cellular signal, and
transmitting the combined cellular signal as the radio uplink signal;
(c2) if voice communication is detected only on the cellular downlink signal, transmitting the cellular downlink signal as an radio uplink signal; and
(c3) if voice communication is detected only on the cellular uplink signal, transmitting the cellular uplink signal as the radio uplink signal.

51. A method according to claim 48, wherein the cellular telephone has radio disablement means for stopping the radio transmission from the cellular telephone, wherein the step (c) comprises the substeps of:
(c1) if the radio disablement means is activated,
stopping transmission of the radio uplink signal,
transmitting the radio downlink signal as the cellular uplink signal, and
converting the radio downlink signal into an audio signal; and
(c2) if the radio disablement means is not activated,
combining the cellular uplink and cellular downlink signals into a combined cellular signal, and
transmitting the combined cellular signal as the radio uplink signal.

52. A method for simultaneous cellular and radio communication in a cellular telephone, wherein the cellular telephone transmits and receives a page signal, wherein the cellular telephone has a first alarm and a second alarm, the method comprising the steps of:
(a) detecting the page signal;
(b) if the cellular telephone is transmitting or receiving the cellular signal, sounding the first alarm; and
(c) if the cellular telephone is not transmitting or receiving the cellular signal, sounding the second alarm.

53. A method for simultaneous cellular and radio communication in a cellular telephone, the method comprising the steps of:
(a) receiving a data command from a radio;
(b) originating the cellular uplink signal based on the data command;
(c) receiving a cellular downlink signal;
(d) maintaining the transmission of the radio uplink signal when voice is detected on the cellular downlink signal; and
(e) transmitting a radio downlink signal as the cellular uplink signal when no voice is detected on the cellular downlink signal.

54. A method for simultaneous cellular and radio communication in a cellular telephone, the method comprising the steps of:
(a) receiving a cellular downlink signal;
(b) transmitting a pager signal to at least one radio;
(c) receiving an accept signal from the at least one radio;
(d) transmitting the cellular downlink signal as a radio uplink signal to the at least one radio; and
(e) transmitting a radio downlink signal as a cellular uplink signal when no voice is detected on the cellular downlink signal.

55. A wireless communication system having simultaneous cellular and radio communication, the wireless communication system comprising:
a base station having a first cellular transceiver for transmitting and receiving a cellular signal;
at least one radio having a first radio transceiver for transmitting and receiving a radio signal;
a cellular telephone having a second cellular transceiver and a second radio transceiver, the second cellular transceiver for transmitting and receiving the cellular signal, the second radio transceiver for transmitting and receiving the radio signal, wherein the second cellular transceiver and the second radio transceiver operate simultaneously.

56. A wireless communication system according to claim 55, wherein the cellular telephone has radio retention means for maintaining the transmission of the radio signal.

57. A wireless communication system according to claim 55, wherein the cellular telephone has radio disablement means for stopping the transmission of the radio signal.

58. A wireless communication system according to claim 55, wherein
the first and second radio transceivers each have a maximum transmitting power of ½ watt, and
the first and second radio transceivers each transmit and receive within the UHF 460 MHz band.

* * * * *